United States Patent [19]

Hendrickson

[11] Patent Number: 4,736,992
[45] Date of Patent: Apr. 12, 1988

[54] ANTI-LOCK BRAKING SYSTEM UTILIZING BOOSTER SUPPLY FOR IMPROVED BRAKING IN SPECIFIC FAILURE MODES

[75] Inventor: Richard T. Hendrickson, South Bend, Ind.

[73] Assignee: Allied Corporation, Morristown, N.J.

[21] Appl. No.: 875,037

[22] Filed: Jun. 17, 1986

[51] Int. Cl.⁴ .......................... B60T 8/88; B60T 8/44; B60T 8/58
[52] U.S. Cl. ..................................... 303/92; 303/114; 303/100
[58] Field of Search ................... 303/DIG. 5, 92, 114, 303/115, 116, 119, 100, 84 A, 84 R

[56] References Cited

U.S. PATENT DOCUMENTS

| | | | |
|---|---|---|---|
| 4,030,758 | 6/1977 | Hayashida | 303/84 A |
| 4,484,784 | 11/1984 | Leiber | 303/92 |
| 4,523,792 | 6/1985 | Belart et al. | 303/92 |
| 4,557,528 | 12/1985 | Leiber | 303/114 X |
| 4,629,258 | 12/1986 | Resch et al. | 303/92 |

Primary Examiner—Andres Kashnikow
Assistant Examiner—Timothy Newholm
Attorney, Agent, or Firm—Ken C. Decker

[57] ABSTRACT

The present invention is a failure mode detection system for use in an anti-lock braking system which comprises a network of fluid level and fluid pressure responsive switches and logic circuitry connected to detect and analyze operating parameters of the adaptive braking system and generate a plurality of output signals for indicating and/or modifying operation of the braking system on the basis of detected failures therein.

20 Claims, 2 Drawing Sheets

ANTI-LOCK BRAKING SYSTEM UTILIZING BOOSTER SUPPLY FOR IMPROVED BRAKING IN SPECIFIC FAILURE MODES

BACKGROUND OF THE INVENTION

The present invention relates to anti-lock braking systems and in particular to circuitry for sensing, analyzing, and generating signals for indicating and/or modifying the response of an anti-lock braking system in response to detected faults in the system.

Anti-lock braking systems are well known. Early anti-lock braking systems were substantially mechanical. Such systems have now progressed to become sophisticated devices which can manage the application of braking forces with great speed, precision, and adaptability to provide substantially increased braking control under varying driving and road conditions. Increasing demand for safety and performance, coupled with the now proven effectiveness of such systems, renders the widespread application of such systems imminent.

Such systems remain, however, relatively expesive. There therefore continues to exist a need to reduce the complexity and corresponding cost of such systems while simultaneously maintaining a high level of reliability and safety. Even the finest components may experience failures as a result of wear, abuse, or damage. There therefore exists a need to provide anti-lock braking systems with means which will enable the system to defect and analyze component failures and to modify operation of the system to provide maximum available operation of the braking system in the event of a failure and to provide both the system and operator with a warning of the existence and nature of any such failure.

Broadly, the present invention is a failure mode detection system for use in an anti-lock braking system which comprises a network of fluid-level and fluid pressure responsive switches and logic circuitry connected to detect and analyze operating parameters of the adaptive braking system and generate a plurality of output signals for indicating and/or modifying operation of the braking system on the basis of detected failures therein.

The anti-lock braking system includes a master cylinder having a primary and a secondary chamber, and a power booster means which includes a pump and an accumulator for generating pressurized braking fluid. An electronic control system generates brake pressure control signals in response to predetermined operating parameters of the vehicle such as wheel speed, wheel acceleration, and the like. Modulating valve means respond to the control signals to control the level of braking pressure to provide optimum braking of the vehicle wheels. One such system described commonly in assigned co-pending U.S. patent application Ser. No. 789,203, filed Oct. 18, 1985 discloses an anti-lock braking system modulating valve configuration wherein a three-way isolation valve normally connects each front wheel cylinder of the braking system and each rear wheel cylinder of the braking system to the primary and secondary chambers of the master cylinder, respectively. A normally closed build valve and a normally closed decay valve have a common fluid connection which is connected to the wheel cylinder or cylinders through the associated isolation valve.

The failure detection circuit of the present invention includes a first pressure differential switch connected between the primary and secondary chambers of the master cylinder, and a second differential pressure switch connected between either the primary or secondary chamber of the master cylinder, and the power booster boost pressure chamber. A pressure switch and fluid level switch may also be connected to the booster and accummulator and the reservoir to respond to the accumulator pressure and reservoir fluid level, respectively. Each of the switches is operable to operate from a normal to an operated state. A logic circuit is connected to the switches to generate output signals in response to predetermined operating combinations of the switches. Specific combinations of operation of the switches are correlated to determine failures in the systems such as, for example, pump failure, gassed brake lines, fluid leaks, and the like.

It is therefore an object of the invention to provide a system for identifying failure modes in an adaptive braking system.

It is another object of the invention to provide such a system incorporating a network of pressure responsive switches for detecting key operating parameters of the adaptive braking system.

Another object of the invention is to provide such a system which incorporates a logic circuit for analyzing operating combinations of the pressure switches.

Still another object of the invention is to provide such a system which generates control signals for modifying operation of the system in response to determined failure modes.

Still another object of the invention is to provide such a system which can provide detection, analysis, indication, and response to failure modes with a high level of reliability and minimum hardware.

These and other objects of the invention and the operation thereof will be best understood in conjunction with the following detailed specification and attached drawings wherein.

DESCRIPTION OF THE PREFERRED EMBODIMENT

Figure 1:
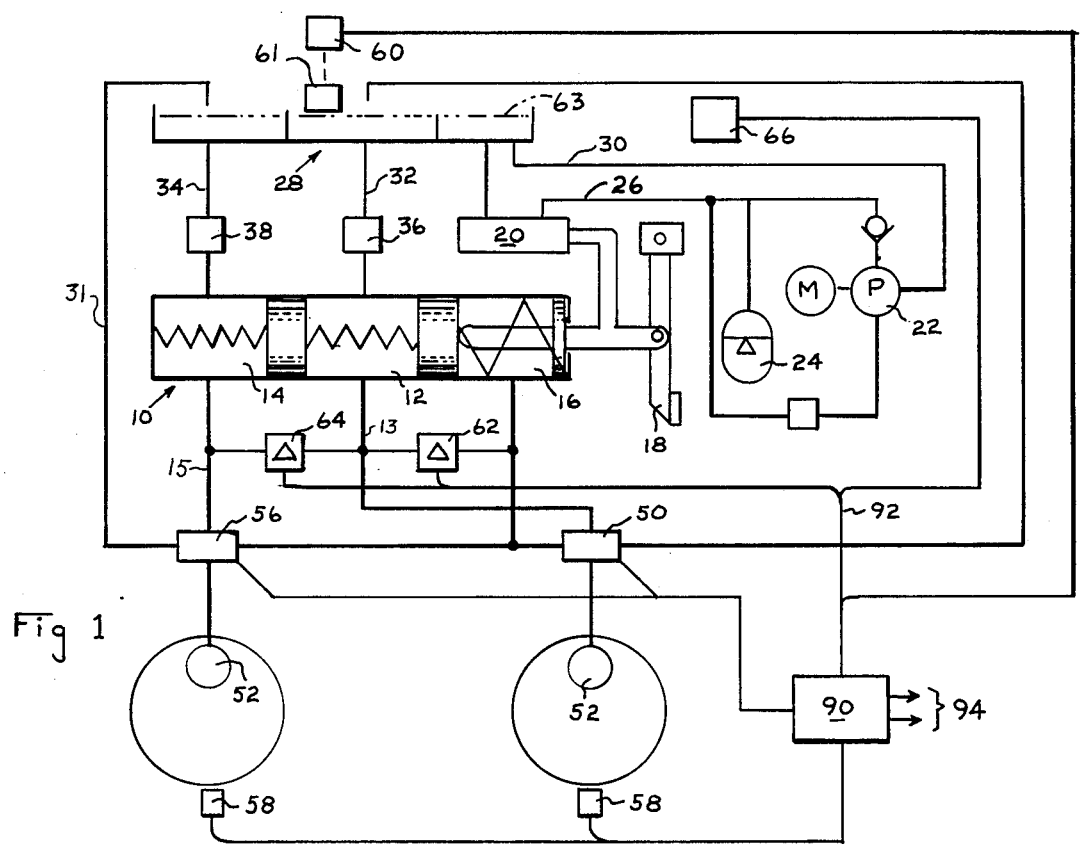
FIG. 1 is a block diagram of an anti-lock braking system incorporating a failure-mode detection circuit in accordance with the invention.
Figure 1A:
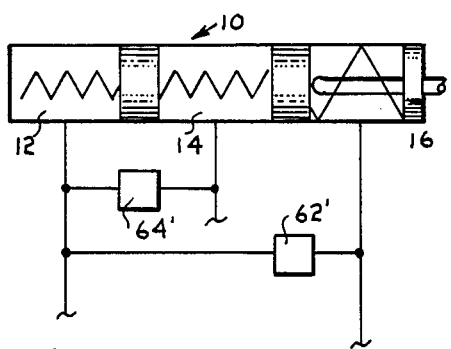
FIGS. 1A and 1B are partial block diagrams showing alternative embodiments of the invention.
Figure 1B:
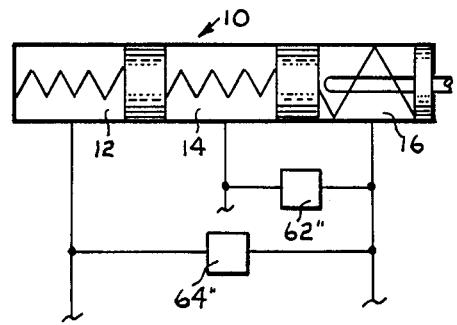

Referring now to the drawing, there is shown in FIG. 1 a functional block diagram of an adaptive braking system for use in a motor vehicle such as in an automobile. The system comprises a dual chamber, displacement type master cylinder full power booster combination 10 having primary and secondary chambers 12, 14, respectively, activated by pressurized fluid in booster chamber 16. The pressure of the fluid in chamber 16 is modulated by means such as a foot pedal 18 operatively coupled to a pressure control valve 20. Pressurized fluid for the system is supplied from a motor driven pump 22 and an accumulator 24 through hydraulic line 26. Fluid is provided to the pump 22 from a fluid reservoir 28 via line 30. Fluid expended by the systems during anti-lock operation is returned to reservoir 28 via a return line 31.

Hydraulic fluid is communicated from the reservoir 28 to cylinders 12, 14 through fluid lines 32, 34, and blocking valves 36, 38. A first or primary hydraulic circuit 13 is connected to chamber 12 and includes a modulating valve means 50 connected to one or more wheel brake cylinders 52. Similarly, secondary brake circuit 15 includes modulating valve means 56 connected to wheel brake cylinder 52.

The modulating valve means 50, 56 are connected to and responsive to control signals from an anti-lock control 90. Control 90 in turn receives a plurality of wheel speed or speed related signals from sensors 58 associated with a vehicle's wheels (not shown). Control 90 includes a computing circuit programmed to analyze the signals from sensors 58 to determine an imminent wheel-lock condition and, in response thereto, automatically generate output signals to modulate braking pressure via modulating means 50, 56 to prevent wheel-lock and maintain vehicle braking at an optimum level.

The modulating valve means may comprise a plurality of solenoid actuated valves such as disclosed in copending commonly assigned U.S. patent application Ser. No. 789,203 or a multiple function device such as disclosed in commonly assigned co-pending U.S. patent application Ser. No. 771,550 now U.S. Pat. No. 4,620,565, filed Sept. 3, 1985 in the name of Brown.

Also provided are a plurality of switches responsive to operating parameters of the braking system. These include a fluid level switch 60 operable by means such as a float 61 disposed in the master cylinder reservoir 28 to sense the level of brake fluid 63; a primary differential pressure switch 64 connected between primary cylinder 12 and secondary cylinder 14; a secondary differential pressure switch 62 connected between primary cylinder master chamber 12 and boost pressure chamber 16 to respond to a predetermined differential pressure therebetween; and a low pressure switch 66 responsive to a predetermined minimum pressure in accumulator 24.

The switches 60, 62, 64 and 66 are connected to appropriate inputs of a micro processor based anti-lock braking control 90 by means such as conductors 92. The processing unit 90, is connected to sensors 58 to sense vehicle wheel speeds to compute various parameters of the wheels rotational behavior during braking and produce a plurality of output signals. These signals operate a plurality of modulating means 50, 56 to modulate braking pressure.

The control 90 is further provided with appropriate software to monitor the operating state of the switches 60, 62, 64 and 66 and to generate appropriate output signals at terminals 94 in response to the logical combination of the possible operating states of the switches 60, 62, 64 and 66. The possible logical combinations of switch operating states are tabulated in the following Table I which shows operating states of the switches, the indicated system failure, and the indicated control response of the anti-lock system to each.

processor. The outputs appearing at 94 may be used to provide a visual indication of the operating state of the braking system or, in the alternative, may be applied directly to the modulating means 50, 56 or to the microprocessor itself to modify operation of the system in response to the various failure modes or terminate operation of the anti-lock system. From Table I above, it will be seen that the various switches 60, 62, 64 and 66 enable detection of a failure of the booster pump and accumulator assembly 22, 24, loss of hydraulic fluid, gas in the brake circuits, and power failures, as well as determination of which of the two hydraulic circuits have been affected. Specifically, if either the primary or secondary braking circuits become gassed, the respective circuit will exhibit low pressure as a result of the compressibility of the gas in the hydraulic circuit. A leak or break in either circuit will also cause a loss of pressure. During anti-lock operation brake fluid is released from the braking circuit via the appropriate modulating means 50, 56 and normally returned to the reservoir 28. A gassed condition will eventually self-correct because of the circulation of hydraulic fluid. A leak in the circuit, however, will normally continue with a progressive loss of hydraulic fluid, ultimately causing a low fluid indication. In either case, maximum braking system performance will be effected by allowing the anti-lock system to continue to operate until the gassed condition alleviates or a subsequent low fluid condition is sensed.

Conversely, if a low fluid condition occurs, further operation of the anti-lock system will be ineffective due to a lack of adequate fluid to replenish the hydraulic circuits after subsequent pressure decay cycles. Similarly, a pump/accumulator failure will cause a loss of required pressurized fluid for continued operation of the anti-lock system. In either case, anti-lock braking is terminated and the braking system is switched to the normal mode. Assuming a now standard split braking system, one or both braking circuits will continue to operate in the manual or powered mode depending upon whether the failure is in one of the hydraulic circuits or in the booster/accumulator itself. It is seen that it is not possible to distinguish between all possible failures. For example a gassed hydraulic circuit produces the same failure indication as a leak in the circuit. However, since the result of these defects on the system is substantially the same, such discrimination is unnecessary. The information provided does, however, provide the necessary information to modify or terminate operation of the anti-lock braking system to minimize the effect of the system failure on braking of the vehicle. This, in turn, is effected utlizing a minimum number of pressure and level sensitive switches and utilization of

TABLE I

| SWITCH | | | | | |
|---|---|---|---|---|---|
| L. Fluid(60) | Low Pres.(66) | P(64) | P(62) | CAUSE | RESPONSE |
| 1 | 0 | 0 | 0 | LOSS OF FLUID | ABS OFF |
| 0 | 1 | 0 | 0 | LEAKS, PUMP FAILURE | ABS OFF |
| 0 | 0 | 0 | 1 | LOST BOOST | ABS OFF |
| 0 | 0 | 1 | 0 | LOST SECONDARY | ABS ON |
| 0 | 0 | 1 | 1 | LOST PRIMARY | ABS ON |

Figure 2:
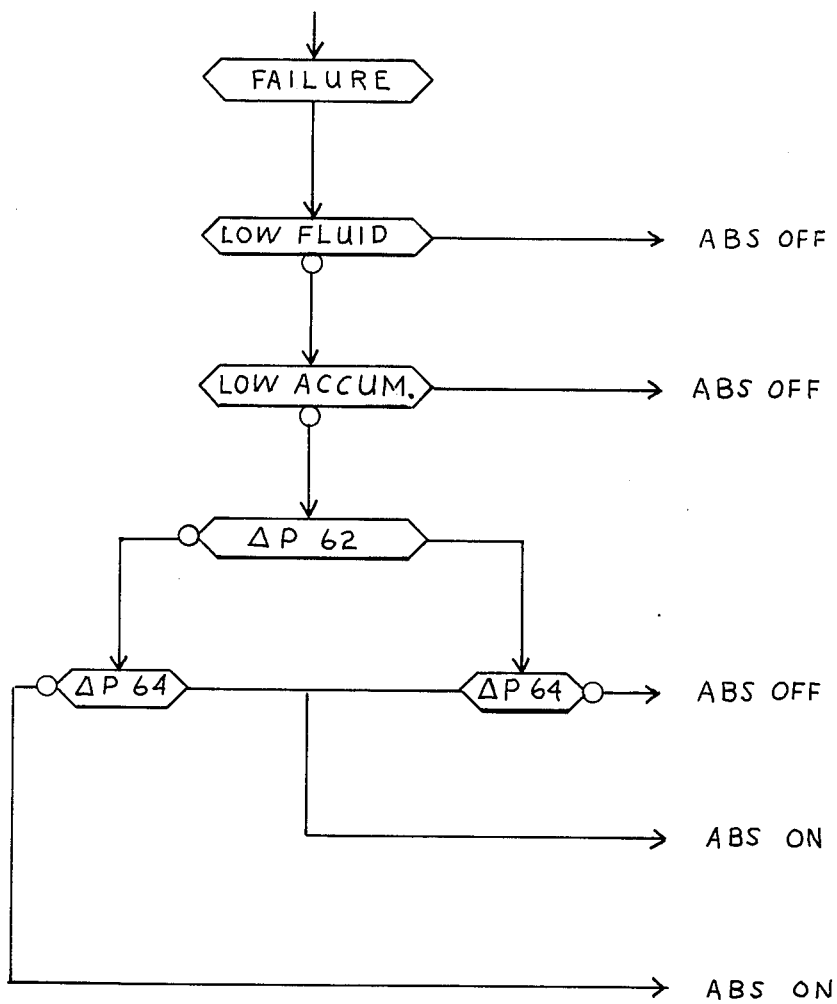
FIG. 2 is a flow chart illustrating the logical sequence used to interrogate and analyze the various switches of the invention and determine the nature of a system failure of a system in accordance with FIG. 1.

FIG. 2 is a flow diagram of the logic sequence incorporated in the micro-processor based control 90. The specific software for effecting this flow chart is of course dependent upon the specific micro processor or computer utilized in the system. In a working embodiment, the control 90 incorporates an Intel 8096 micro processor based control of the anti-lock braking system.

The following Tables II and III to relate to alternative arrangements of the two differential pressure switches 62, 64. From the tabular data, it is seen that each arrangement provides the necessary data for interpreting failure mode operation of the system.

TABLE II

| SWITCH | | | | | |
|---|---|---|---|---|---|
| L. Fluid(60) | Low Press.(66) | P(64) | P(62) | CAUSE | RESPONSE |
| 1 | 0 | 0 | 0 | LOSS OF FLUID | ABS OFF |
| 0 | 1 | 0 | 0 | PUMP FAILURE | ABS OFF |
| 0 | 0 | 0 | 1 | LOST BOOST | ABS OFF |
| 0 | 0 | 1 | 0 | LOST PRIMARY | ABS ON |
| 0 | 0 | 1 | 1 | LOST SECONDARY | ABS ON |

TABLE III

| SWITCH | | | | | |
|---|---|---|---|---|---|
| L. Fluid(60) | Low Press.(66) | P(64) | P(62) | CAUSE | RESPONSE |
| 1 | 0 | 0 | 0 | LOST FLUID | ABS OFF |
| 0 | 1 | 0 | 0 | LOST PUMP | ABS OFF |
| 0 | 0 | 0 | 1 | LOST PRIMARY | ABS ON |
| 0 | 0 | 1 | 0 | LOST SECONDARY | ABS ON |
| 0 | 0 | 1 | 1 | LOST BOOST | ABS OFF |

It should be noted that in the above description, a simultaneous double failure is assumed not to occur. It should further be noted that all sensors incorporate single acting switches.

Furthermore, it is contemplated that one skilled in the art could make many modifications and/or changes to the invention as described herein without deviation from the essence thereof. As such these modifications and/or changes are intended to fall within the scope of the appended claims.

What I claim is:

1. A failure detection circuit for use in an anti-lock braking system which includes a master cylinder having primary, secondary and boost cylinders connected to primary and secondary hydraulic circuits, respectively, each hydraulic circuit including at least one wheel cylinder, hydraulic booster means including a pump, accumulator, and manually modulated valve means for selectively applying a pressurized brake fluid to said master cylinder, and an anti-lock control system for sensing the rotational behavior of the wheels of a vehicle associated with said wheel cylinders in response to braking thereof and generating a plurality of braking control signals in response thereto, said anti-lock control system further including anti-lock modulator valve means associated with said wheel cylinders and responsive to said control signals to modulate application of braking pressure thereto, the circuit comprising a primary differential pressure switch connected between said secondary hydraulic circuit and one of said boost cylinder said said primary hydraulic circuit to operate from a normal to an operated state in response to a predetermined pressure differential therebetween, a secondary differential pressure switch connected between one of said secondary and said primary hydraulic circuits and said boost cylinder to operate from a normal to an operated state in response to a predetermined pressure differential therebetween, and a low pressure switch connected to said booster means and operable in response to a predetermined minimum pressure therefrom, said primary and secondary differential pressure switches and said pressure switch generating primary and secondary differential pressure signals and a low pressure signal, respectively, said anti-lock control system including computing circuit means responsive to the output of said primary and secondary differential pressure switches and said pressure sensing switch to either enable or disable said anti-lock control system as a function of the logical combinations of the outputs of said primary and secondary differential pressure switches and said low pressure switch.

2. The circuit of claim 1 wherein said master cylinder includes a reservoir and further including a low fluid level responsive switch operatively connected to said reservoir and operable from a normal to an operated state in response to a predetermined minimum level of fluid in said reservoir to generate a low fluid output signal, said computing circuit means being connected to receive said low fluid signal for generating output signals in response to the logical combination thereof with said primary and secondary differential pressure signals and said low pressure signal, each logical combination being indicative of a predetermined failure mode of said braking system.

3. The circuit of claim 2 wherein said primary differential pressure switch is connected between said primary and said secondary hydraulic circuits, said secondary differential pressure switch is connected between said primary hydraulic circuit and said boos cylinder.

4. The circuit of claim 3 wherein said computing circuit means generates a control signal to determine operation of said anti-lock braking system in response to an operated state of said low fluid level responsive switch.

5. The circuit of claim 3 wherein said computing circuit means generates a control signal determining operation of said anti-lock braking system in response to an operated state of said low pressure switch.

6. The circuit of claim 3 wherein said computing circuit means generates a control signal to terminate operation of said anti-lock braking system in response to an operated state of said secondary differential pressure switch.

7. The circuit of claim 3 wherein said computing circuit means generates a control signal to continue operation of said anti-lock braking system in response to an operated state of said primary differential pressure switch and to indicate a failure in said secondary hydraulic circuit.

8. The circuit of claim 3 wherein said computing circuit means generates a control signal to continue operation of said anti-lock braking system and to indicate a failure in said primary hydraulic circuit in response to an operated state of said primary and said secondary differential pressure switches.

9. The circuit of claim 2 wherein said primary differential pressure switch is connected between said primary and said secondary hydraulic circuit, said secondary differential pressure switch being connected between said secondary hydraulic circuit and said boost cylinder.

10. The circuit of claim 9 wherein said computing circuit means generates a control signal determining operation of said anti-lock braking system in response to an operated state of said low pressure switch.

11. The circuit of claim 9 wherein said computing circuit means generates a control signal to terminate operation of said anti-lock braking system in response to an operated state of said low pressure switch.

12. The circuit of claim 9 wherein said computing circuit means generates a control signal to terminate operation of said anti-lock braking system in response to an operated state of said secondary differential pressure switch.

13. The circuit of claim 9 wherein said computing circuit means generates a control signal to continue operation of said anti-lock braking system and indicate a failure of said primary hydraulic circuit in response to an operated state of said primary differential switch.

14. The circuit of claim 9 wherein said computing circuit means generates a control signal to continue operation of said anti-lock braking system and indicate failure in said secondary hydraulic circuit in response to an operated state of said primary and said secondary differential pressure switches.

15. The circuit of claim 2 wherein said primary differential pressure switch is connected between said secondary hydraulic circuit and said booster, said secondary differential pressure switch being connected between said primary hydraulic circuit and said boost cylinder.

16. The computing circuit of claim 15 wherein said computing circuit means generates a control signal to terminate operation of said anti-lock braking system in response to an operated state of said low fluid level responsive switch.

17. The circuit of claim 16 wherein said computing circuit means generates a signal to terminate operation of said anti-lock braking system in response to an operated state of said low pressure switch.

18. The circuit of claim 15 wherein said computing circuit means generates a signal to terminate operation of said anti-lock braking system in response to an operated state of said primary and said secondary differential pressure switches.

19. The circuit of claim 15 wherein said computing circuit means generates a control signal to continue operation of said anti-lock braking system and to generate an indication of a failure of said primary hydraulic circuit in response to an operated state of said secondary differential pressure switch.

20. The circuit of claim 16 wherein said computing circuit means generates a control signal to continue operation of said anti-lock braking system and to indicate a failure of said secondary hydraulic circuit in response to an operated state of said primary differential pressure switch.

* * * * *